(12) United States Patent
Grigg et al.

(10) Patent No.: US 9,588,342 B2
(45) Date of Patent: Mar. 7, 2017

(54) CUSTOMER RECOGNITION THROUGH USE OF AN OPTICAL HEAD-MOUNTED DISPLAY IN A WEARABLE COMPUTING DEVICE

(71) Applicant: Bank of America Corporation, Charlotte, NC (US)

(72) Inventors: David M. Grigg, Rock Hill, SC (US); Richard Andrew Starbuck, Walnut Creek, CA (US); Carrie Anne Hanson, Charlotte, NC (US); Alicia C. Jones, Fort Mill, SC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 14/251,094

(22) Filed: Apr. 11, 2014

(65) Prior Publication Data

US 2015/0293356 A1 Oct. 15, 2015

(51) Int. Cl.
*G02B 27/01* (2006.01)
*H04W 4/20* (2009.01)
*G06K 9/00* (2006.01)

(52) U.S. Cl.
CPC .......... *G02B 27/017* (2013.01); *H04W 4/206* (2013.01); *G02B 2027/014* (2013.01); *G02B 2027/0138* (2013.01); *G02B 2027/0178* (2013.01); *G02B 2027/0187* (2013.01); *G06K 9/00288* (2013.01)

(58) Field of Classification Search
USPC ..................................................... 345/156, 8
See application file for complete search history.

(56) References Cited

U.S. PATENT DOCUMENTS

| 7,349,557 | B2 | 3/2008 | Tibor |
| 7,398,253 | B1 | 7/2008 | Pinnell |
| 7,606,770 | B2 | 10/2009 | Pinnell |
| 7,716,129 | B1 | 5/2010 | Tan et al. |
| 8,184,070 | B1 | 5/2012 | Taubman |
| 8,485,422 | B2 | 7/2013 | Rometty et al. |
| 8,490,865 | B2 | 7/2013 | Randazza et al. |
| 8,500,031 | B2 | 8/2013 | Naelon |
| 8,559,924 | B1 | 10/2013 | Henderson |
| 2008/0126116 | A1 | 5/2008 | Singhai |
| 2009/0300744 | A1 | 12/2009 | Guo et al. |

(Continued)

*Primary Examiner* — Jennifer Mehmood
*Assistant Examiner* — Deeprose Subedi
(74) *Attorney, Agent, or Firm* — Michael A. Springs; Moore & Van Allen PLLC; James C. Edwards (57) ABSTRACT

Systems, apparatus, and computer program products are provided for implementing a wearable computing device having an Optical Head-Mounted Display (OHMD) to automatically determine which individuals within a business environment, such as a retail store, banking center or the like, are established customers. Such a determination of established customer status is conducted without requiring any action on behalf of the individuals/customers currently located within the business environment and can be accomplished when the established customer enters the business location or shortly thereafter. Once established customers are identified, customer indicators are provided within the view of the OHMD, so that a business associate/employee can readily identity which individual within their field of view are established customers.

16 Claims, 4 Drawing Sheets

(56) References Cited

U.S. PATENT DOCUMENTS

| | | |
|---|---|---|
| 2010/0146263 A1 | 6/2010 | Das et al. |
| 2011/0166869 A1 | 7/2011 | Froelich |
| 2012/0030043 A1 | 2/2012 | Ross et al. |
| 2012/0050144 A1 | 3/2012 | Morlock |
| 2012/0203700 A1 | 8/2012 | Ornce et al. |
| 2013/0042314 A1 | 2/2013 | Kelley |
| 2013/0054473 A1 | 2/2013 | Jan et al. |
| 2013/0110658 A1 | 5/2013 | Lyman et al. |
| 2013/0208234 A1 | 8/2013 | Lewis |
| 2013/0212024 A1 | 8/2013 | Mattsson et al. |
| 2013/0242262 A1 | 9/2013 | Lewis |
| 2013/0246203 A1 | 9/2013 | Laracey |
| 2013/0246258 A1 | 9/2013 | Dessert |
| 2013/0246260 A1 | 9/2013 | Barten et al. |
| 2014/0006190 A1 | 1/2014 | Loomis, III et al. |
| 2014/0122344 A1 | 5/2014 | Foulds et al. |
| 2014/0160157 A1* | 6/2014 | Poulos .................... G06F 3/011 345/633 |
| 2014/0306994 A1* | 10/2014 | Brown .................. G06T 19/006 345/633 |
| 2014/0344153 A1 | 11/2014 | Raj et al. |
| 2015/0142596 A1* | 5/2015 | Jakobson et al. .... G06Q 20/209 |
| 2015/0143283 A1* | 5/2015 | Noda et al. ........... G06F 3/0485 |
| 2015/0294306 A1 | 10/2015 | Grigg et al. |
| 2015/0294307 A1 | 10/2015 | Grigg et al. |
| 2015/0294322 A1 | 10/2015 | Grigg et al. |

\* cited by examiner

CUSTOMER RECOGNITION THROUGH USE OF AN OPTICAL HEAD-MOUNTED DISPLAY IN A WEARABLE COMPUTING DEVICE

The following United States Patent applications, which have been filed concurrently with the present application, are assigned to the same inventive entity as the present invention and include common inventors, are herein incorporated by reference as if set forth fully herein:

| U.S. patent application Ser. No. | Title | Filed On |
|---|---|---|
| 14/251,351 | USER AUTHENTICATION BY OPERATING SYSTEM-LEVEL TOKEN | Apr. 11, 2014 |
| 14/251,291 | USER AUTHENTICATION BY TOKEN AND COMPARISON TO VISITATION PATTERN | Apr. 11, 2014 |
| 14/250,972 | SECURITY MONITORING IMPLEMENTING CUSTOMER RECOGNITION VIA AN AUGMENTED REALITY DISPLAY | Apr. 11, 2014 |

FIELD

In general, embodiments of the invention relate to customer service and, more particularly, implementing a wearable computer having an Optical Head-Mounted Display (OHMD) to automatically recognizing the presence of established customers within a business location and identifying the established customers within the view presented to a business associate/employee through the OHMD.

BACKGROUND

In many business settings, such as with a retail store environment or a banking center, an associate/employee of the business benefits from knowing which of the individuals/customers are pre-existing or established customers of the business. However, unless the associate/employee visually recognizes the established customer from previous business encounters or the like, the associate/employee has no means of identifying established customer, absent some form of identifying action on behalf of the established customer. For example, grocery stores customers may present a loyalty card prior to completing a purchase or banking customers may authenticate themselves as established customers (e.g., present debit/credit card and provide requisite Personal Identification Number (PIN) prior to conducting a transaction at a teller station. However, such identification of the established customer not only requires action on behalf of the customer but is performed at or proximate to the time at which the established customer transacts. In many instances, the business associate/employee desires or would benefit from knowing which individuals are customers when the customer enters the business environment or shortly thereafter to ensure that the established customer is given proper deference or the like.

In addition to having a desire to know which of the individuals in the business environment are established customers when the individuals enter the business environment and absent customer action, the associate/employee also desires and/or benefits from having ready access to other information about the customer, such as customer status, customer affinities, customer relationship (e.g., previous transactions and/or accounts held by the customer) and the like. This information may be desired by the associate/employee to better serve the established customer and to personalize the customer's experience with the business. However, current means of obtaining such information, such as having the associate/employee access a computer in order to look up a customer profile in a business database are impractical and inefficient, since the associate/customer has to adhere to other job responsibilities/functions.

Therefore, a need exists to develop systems, apparatus, methods, computer program products and the like that automatically, without requiring an action on behalf of customer/intervention, identify which individuals/customers within a business location are established customers of the business. In addition, a need exists to identify the established customers at the onset of the established customer's presence at the business so as to ensure that the customer is given proper attention and service. In addition to identifying established customers, a need exists to provide immediate and/or on-demand access to information associated with established customers, such as customer status (e.g., VIP status or the like), customer relationship, customer affinities or the like so that the business associates/customer can better address the established customer's needs and better the customer's experience at the business location.

SUMMARY OF THE INVENTION

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing apparatus, computer program products or the like for automatically determining which individuals within a business environment, such as a retail store, banking center or the like, are established customers (i.e., have conducted transactions with the business in the past and/or hold accounts at the business). Such a determination of established customer status is conducted without requiring any action on behalf of the individuals/customers currently located within the business environment and can be accomplished when the established customer enters the business location or shortly thereafter. In addition to identifying those individuals with the business environment that are established customers are providing such information to requisite business associates/employees, the present invention also provides for immediate access or visibility to other information related to the established customers relationship with the business, such as customer status, customer affinities, previous customer dealings/transactions, accounts held by the customer and the like.

An apparatus for recognizing and identifying established customers within a business location defines first embodiment of the invention. The apparatus includes a wearable computing device including a memory, a processor in communication with the memory and an Optical Head-Mounted Display (OHMD) in communication with the processor. In this regard, the wearable computing device may comprise a computing device embedded in eyewear. The apparatus also includes a customer recognition and identification module that is stored in the memory and executable by the processor. The module is configured to provide a user, via the OHMD, a view of a business location occupied by one or more individuals and determine which of the individuals within the view are established customers of the business. In response to determining which of the individuals are established customers, the module is further configured to present, within the OHMD, one or more customer identifiers within the view. Each of the customer identifiers are associated with a corresponding one of the individuals determined to be an established customer of the business and serve to identify corresponding individual as an established customer.

In specific embodiments of the apparatus, the customer recognition and identification module is further configured to determine which of the individuals within the views are established customers by (1) capturing, via the wearable computing device, a facial images of one or more of the individuals, (2) determining one or more matches between the facial images of the individuals and facial images of established customers by comparing characteristics of the facial images of the individuals to a database of facial images of established customers and (3) identifying one or more individuals within the view as established customers based on the one or more determined matches.

In other specific embodiments of the apparatus, the customer recognition and identification module is further configured to determine which of the individuals within the view are established customers by (1) receiving an electronic communication from mobile communication devices in possession of corresponding individuals within the view, such that the electronic communication is communicated from the mobile communication device (a) absent user input and (b) based on the mobile communication device being located within boundaries of the business location, and (2) determining that the individual in possession of the mobile communication device is an established customer based on information in the electronic communication. In such embodiments of the apparatus, the electronic communication may be a token, which exists at the Operating System (OS)-level of the mobile communication device, and is configured to identify the individual in possession of the mobile communication device as the established customer. In additional related embodiments, the customer recognition and identification module is further configured to determine the location of the mobile communication devices determined to be in possession of the established customers, such that the customer identifiers are subsequently presented, within the OHMD, proximate to the location of the mobile communication devices.

In further specific embodiments of the apparatus, the customer recognition and identification module is further configured to present, within the OHMD, one or more customer identifiers within the view, such that each customer identifier "attaches" to a corresponding established customer displayed within the OHMD. Attachment provides for the customer identifier to follow the corresponding established customer as the established customer moves within the view of the user (or out of into the view of the user) as displayed by the OHMD, thereby creating an augmented reality environment within the OHMD.

In still further specific embodiments of the apparatus, the customer recognition and identification module is further configured to provide the user selectable access to display, on the OHMD, of customer profile information associated with each of the established customer. In specific related embodiments of the apparatus, the customer profile information may include customer risk information, customer status, customer affinity, accounts held by the established customer at the business, products/services purchased at the business by the established customer or the like.

A method for automated customer recognition and identification within a business location defines second embodiments of the invention. The method includes providing a user, via an Optical-Head Mounted Display (OHMD) of a wearable computing device, a view of a business location occupied by one or more individuals. In addition, the method includes determining, by a computing device processor, which of the individuals within the view are established customers of the business. Additionally, the method includes presenting, within the OHMD, one or more customer identifiers within the view, wherein each of the identifiers are associated with one of the individuals determined to be an established customer of the business.

In specific embodiments of the method, determining which of the individuals within the views are established customers further includes (1) capturing, by the wearable computing device, a facial image of the individuals, (2) determining one or more matches between the facial images of the individuals and facial images of established customers by comparing characteristics of the facial images of the individuals to a database of facial images of established customers, and (3) identifying one or more individuals within the view as established customers based on the one or more determined matches.

In other specific embodiments of the method, determining which of the individuals within the view are established customers further includes receiving an electronic communication from mobile communication devices in possession of corresponding individuals within the view and determining that the individual in possession of the mobile communication device is an established customer based on information in the electronic communication. In such embodiments the electronic communication may comprise a token that exists at the OS-level and identifies the individual in possession of the mobile communication device as the established customer. In addition, the electronic communication is communicated from the mobile communication device (1) absent user input and (2) based on the mobile communication device being located within boundaries of the business location. In such embodiments the method may further include determining the location of the mobile communication devices determined to be in possession of the established customers and presenting, within the OHMD, the one or more customer identifiers further includes presenting, within the OHMD, the one or more customer identifiers proximate to the location of the mobile communication devices.

In still further specific embodiments of the method, presenting, within the OHMD, the one or more customer identifiers within the view further comprises presenting, within the OHMD, the one or more customer identifiers within the view, such that each customer identifier attaches to a corresponding established customer displayed within the OHMD and follows the corresponding established customer as they move within the view of the user.

Moreover, in other embodiments the method includes providing selectable access to display, on the OHMD, of customer profile information associated with each of the established customer, wherein the customer profile information includes at least one of customer status, customer affinity, accounts held by the established customer at the business or products purchased at the business by the established customer.

A computer program product including a non-transitory computer-readable medium defines third embodiments of the invention. The computer-readable medium includes a first set of codes for causing a computer to determine which of the individuals displayed within a view of an Optical-Head Mounted Display (OHMD) are established customers of a business. In addition, the computer-readable medium includes a second set of codes for causing a computer to present, within the OHMD, one or more customer identifiers within the view, such that each of the identifiers are associated with one of the individuals determined to be an established customer of the business.

Thus, systems, apparatus, methods, and computer program products herein described in detail below provide for implementing a wearable computing device having an Optical Head-Mounted Display (OHMD) to automatically determine which individuals within a business environment, such as a retail store, banking center or the like, are established customers. Such a determination of established customer status is conducted without requiring any action on behalf of the individuals/customers currently located within the business environment and can be accomplished when the established customer enters the business location or shortly thereafter. Once established customers are identified, customer indicators are provided within the view of the OHMD, so that a business associate/employee can readily identity which individual within their field of view are established customers. In addition to identifying those individuals with the business environment that are established customers are providing such information to requisite business associates/employees, the present invention also provides for immediate access or visibility, via the OHMD, to other information related to the established customers relationship with the business, such as customer status, customer affinities, previous customer dealings/transactions, accounts held by the customer and the like.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Having thus described embodiments of the invention in general terms, reference will now be made to the accompanying drawings, which are not necessarily drawn to scale, and wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Although some embodiments of the invention described herein are generally described as involving a "financial institution," one of ordinary skill in the art will appreciate that the invention may be utilized by other businesses that take the place of or work in conjunction with financial institutions to perform one or more of the processes or steps described herein as being performed by a financial institution.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as Java, Perl, Smalltalk, C++ or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatuses (the term "apparatus" including systems and computer program products). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

According to embodiments of the invention described herein, various systems, apparatus, methods, and computer program products are herein described for implementing a wearable computing device having an Optical Head-Mounted Display (OHMD) to automatically determine which individuals within a business environment, such as a retail store, banking center or the like, are established customers. Such a determination of established customer status is conducted without requiring any action on behalf of the individuals/customers currently located within the business environment and can be accomplished when the established customer enters the business location or shortly thereafter. Once established customers are identified, customer indicators are provided within the view of the OHMD, so that a business associate/employee can readily identity which individual within their field of view are established customers. In addition to identifying those individuals with the business environment that are established customers are providing such information to requisite business associates/employees, the present invention also provides for immediate access or visibility, via the OHMD, to other information related to the established customers relationship with the business, such as customer status, customer affinities, previous customer dealings/transactions, accounts held by the customer and the like.

Figure 1:
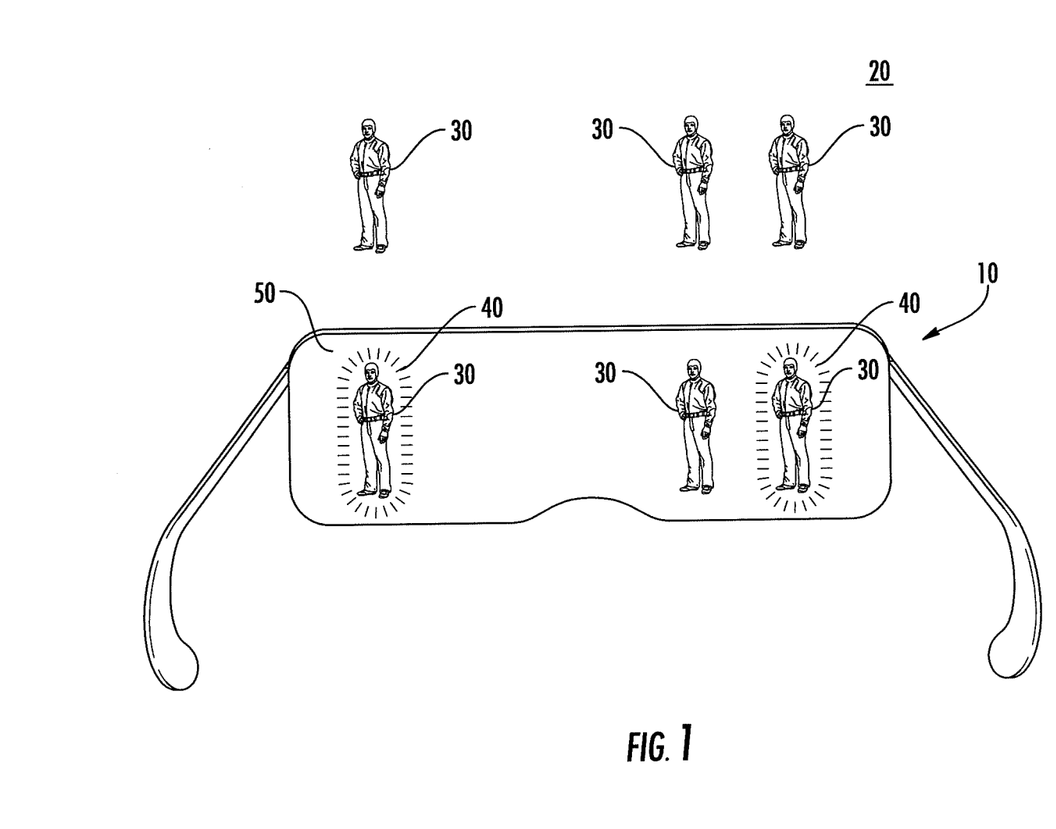
FIG. 1 provides a schematic view of a wearable computing device having an Optical Head-Mounted Display (OHMD) that is configured to present within the view of the OHMD customer identifiers in response to automatically identifying individuals as established customers, in accordance with embodiments of the present invention.

Referring to FIG. 1, a schematic diagram is presented of a wearable computing device 10 including an Optical Head-Mounted Display (OHMD) 50, in accordance with an embodiment of the present invention. The wearable computing device is conjured as eyewear that is worn by a user, in embodiments of the present invention, the wearable computing device is worn/used by an employee/associate of the business. The OHMD display 50 provides for the user to view the surrounding environment 20 in conjunction with display of data/information provided by the computing functionality of the wearable computing device 10. In the illustrated embodiment of the present invention the surrounding environment is a business location such as a retail store, a banking center or the like, which is occupied by one or more individuals 30. The individuals 30 may be new or potential customers of the business or the individuals may be established customers of the business (i.e., customers with a pre-existing relationship with the business, such as having conducted previous transactions with the business and/or having accounts with the business or the like).

In accordance with embodiments of the present invention, the wearable computing device 10 is configured to automatically (and without requiring action on the part of the individuals) identify which of the individuals being viewed through OHMD 50 are established customers. The means by which the individuals being monitored are identified as established customers are discussed in detail infra. In response to identification of the established customers, customer identifiers 40 are presented in the OHMD 50 of wearable computing device 10, such that employee/associate (not shown in FIG. 1) can readily comprehend which of the individuals within the view are established customers. In the illustrated embodiment of FIG. 1 the customer identifier 40 is graphically presented as an outline around the established customer that serves to accentuate the established customer in the OHMD 50. It should be noted that the customer identifier 40 make take on the form of any graphical indicator that differentiates the established customer from the other individuals within the display. In accordance with specific embodiments of the present invention, the graphical customer identifier 40 "attaches" to the established customer, such that as the established customer moves, as viewed through the OHMD 50, (or moves into and/or out of the display) the customer identifier 40 follows the established customer, thereby creating an augmented reality environment within the OHMD 50. Further, the customer identifier 40 may be configured to include a user selectable link or the like, which when activated by the employee/associate provides the employee//associate access to customer profile information stored by the business.

Figure 2:
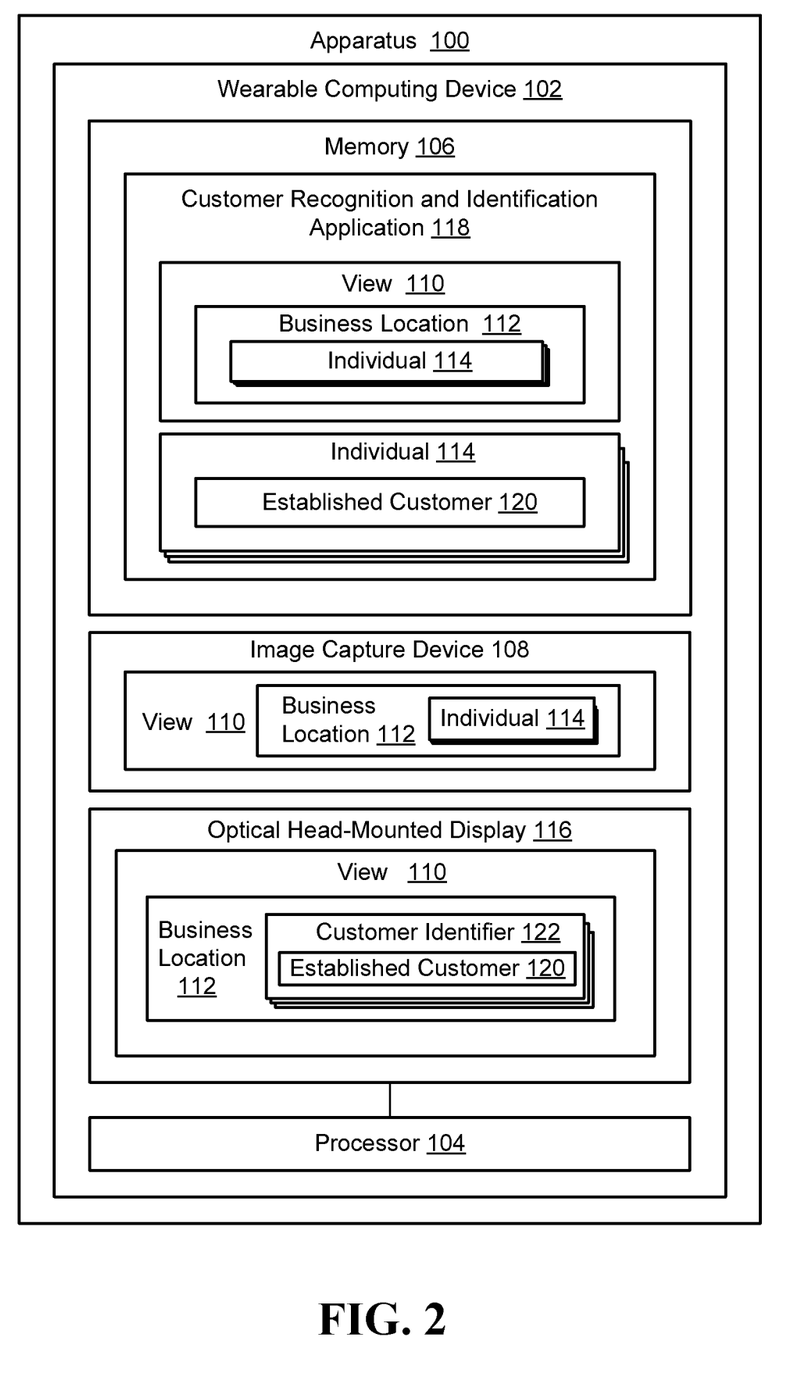
FIG. 2 provides a block diagram of an apparatus configured for automatically recognizing the presence of established customers within a business location and identifying the established customers within the view presented to a business associate/employee through the OHMD, in accordance with embodiments of the present invention.

Referring to FIG. 2, a block diagram is presented of an apparatus 100 configured for wearable computing device identification of established customers within a business location and identifying the established customers on an associated Optical head-Mounted Display (OHMD), in accordance with embodiments of the present invention. The system includes a wearable computing device 102 implemented on a computing platform that includes a memory 106 and at least one processor 104 in communication with the memory 14. Additionally, wearable computing device 102 may include an image-capturing device 108 that is in communication with processor 104 configured to capture the view 110 of the business location(s) 112 within the business occupied by individuals 114 (i.e., non-employees, such as new/potential customers and/or existing/established customers). In addition, wearable computing device 102 includes OHMD 116 that is in communication with the processor 104 and configured to display the view 110 of the business location 112 as captured by image-capturing device 108.

The memory 106 of wearable computing device 102 stores customer recognition and identification application 118 that is configured to receive the view 110 of the business location(s) 112 that are occupied by one or more individuals 114 and automatically identify/determine (without requiring any overt action by the individuals) which of the individuals 114 within the view 110 are established customers 120 of the business. In response to the identification/determination of established, the customer recognition and identification application 112 is further configured to present customer identifiers 122 in the view 110 of OHMD 116, which serve to identify those individuals that have been identified as established customers 120. In specific embodiments of the invention, the customer identifiers 122 are presented in the display 116 so to "attach" to a corresponding established customer 120. Attachment provides for the customer identifier 122 to follow the corresponding established customer 120 as the established customer moves within (and into and out of) the view 110 displayed on OHMD 116. In this regard, the attached customer identifier 122 provides for augmented reality environment within the view 110 of the OHMD 116, whereby individuals identified as established customers are continuously identified with the OHMD as such, thus allowing the employee/associate viewing the OHMD 116 to be constantly aware of which individuals within his/her view are established customers 120 and conversely, which of the individuals not identified are not established customers.

Figure 3:
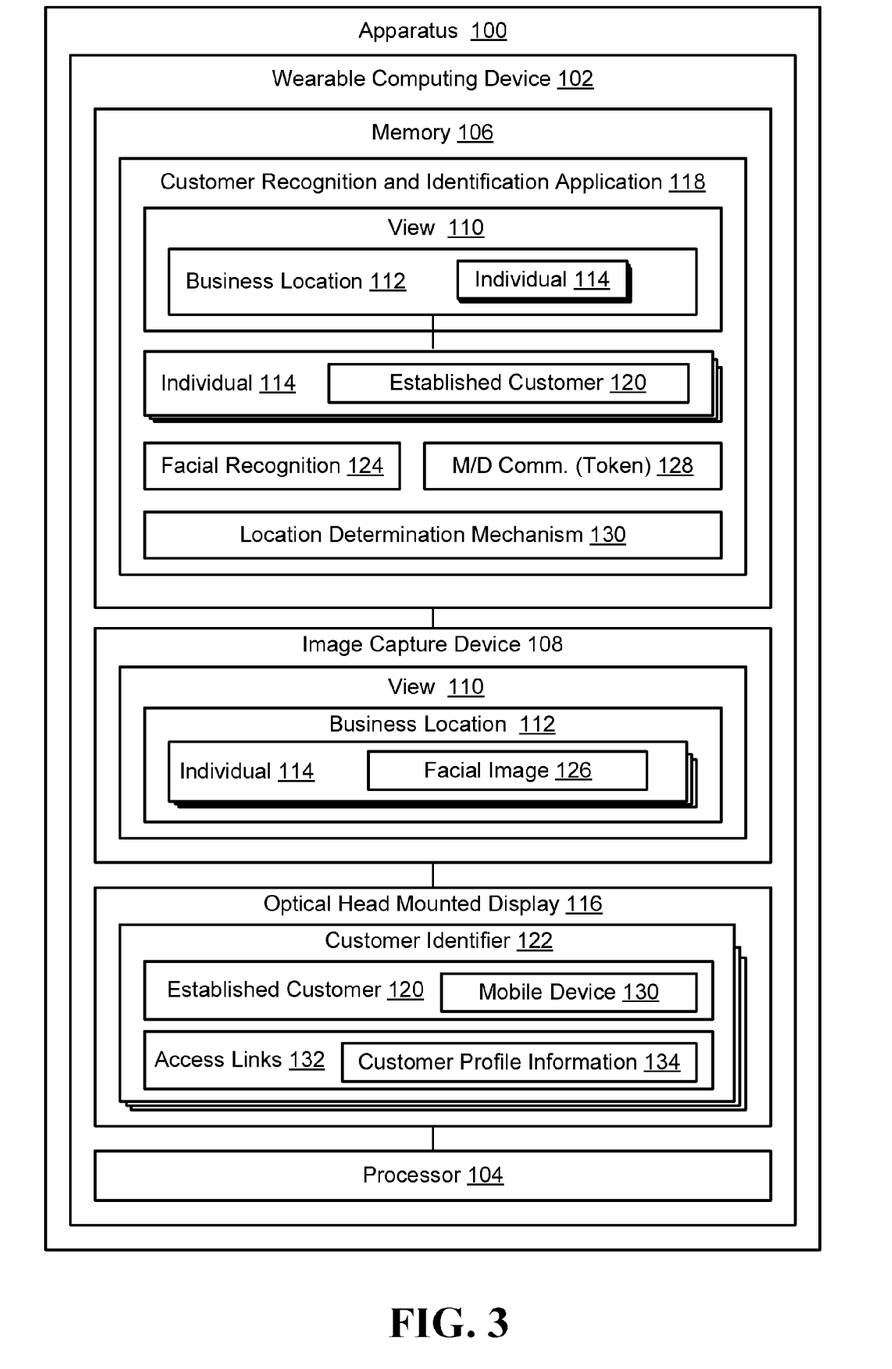
FIG. 3 provides a more detailed block diagram of an apparatus configured for automatically recognizing the presence of established customers within a business location and identifying the established customers within the view presented to a business associate/employee through the OHMD, in accordance with present embodiments of the invention.

Referring to FIG. 3, a block diagram is presented of an apparatus 100 configured for wearable computing device identification of established customers within a business location and identifying the established customers on an associated Optical head-Mounted Display (OHMD), in accordance with embodiments of the present invention. The apparatus 100 includes wearable computing device 102. The wearable computing device 102 is operable to receive and execute modules, routines and applications, such as customer recognition and identification application 118 and the like.

The wearable computing device 102 includes a computing platform that can receive and execute routines and applications. The computing platform includes memory 106, which may comprise volatile and nonvolatile memory such as read-only and/or random-access memory (RAM and ROM), EPROM, EEPROM, flash cards, or any memory common to computer platforms. Further, memory 106 may include one or more flash memory cells, or may be any secondary or tertiary storage device, such as magnetic media, optical media, tape, or soft or hard disk.

Further, the computing platform also includes at least one processor 104, which may be an application-specific integrated circuit ("ASIC"), or other chipset, processor, logic circuit, or other data processing device. Processor 104 or other processor such as ASIC may execute an application programming interface ("API") layer (not shown in FIG. 3) that interfaces with any resident programs, such as customer recognition and identification application 118 or the like, stored in the memory 106 of wearable computing device 102. Processor 104 includes various processing subsystems (not shown in FIG. 3) embodied in hardware, firmware, software, and combinations thereof, that enable the functionality of wearable computing device 102 and the operability of the apparatus on a network. For example, processing subsystems allow for initiating and maintaining communications, and exchanging data, with other networked devices. Additionally, processing subsystems may include any portion of the functionality of customer recognition and identification application 118 obviating the need for such applications and modules to be stored in the memory.

As previously noted in relation to FIG. 2, wearable computing device 102 includes an image-capturing devices 108, such as a video camera or the like, that are in communication with processor 104. In addition, wearable computing device 102 includes OHMD 116 that is in communication with the processor 104 and configured to display the view 110 of the business location 112.

The memory 106 of wearable computing device 102 stores internally or is capable or remotely accessing customer recognition and identification application 118 that is configured to provide for or otherwise the view 110 of the business location 112 that is occupied by one or more individuals 114 and automatically identify/determine (without requiring any overt action by the individuals) which of the individuals 114 within the view 110 are established customers 120 of the business.

In specific embodiments of the invention, the customer recognition and identification application 118 is configured to implement facial recognition 124 processing to identify which of the individuals 114 within the view 110 are established customers 120. In such embodiments of the invention, the application 118 is configured to implement the image capture device 108 to capture facial images 126 of the individuals 114 from the view 110. In response to capturing the facial images 126, the application 118 is further configured to access a database (not shown in FIG. 3, such as a customer profile database that includes stored facial images of established customers, compare characteristics of the facial images 126 of the individuals 114 to the facial images of established customers and determine one or matches between the facial images 126 of the individuals 114 and the facial images of established customers. A "match" results from a predetermined percentage of certainty that an individual in one image is the same individual in another image based on predetermined level of similar or same characteristics within the images (e.g., facial structure, eye geometry, eye color, nose geometry/shape, and the like). Established customer(s) 120 are identified based on a determined match between the captured facial image 126 and a facial image stored in the database.

In other embodiments of the invention, the customer recognition and identification application 118 is configured to determine which of the individuals 114 within the view 110 are established customers based on the application receiving an electronic communication 128 from a mobile communication device (not shown in FIG. 3) in possession of a corresponding individual 114 displayed in the view 110. The electronic communication is communicated from the mobile communication device automatically without any overt action being taken by the individual in possession of the device and is communicated based on the mobile communication device being located within predetermined boundaries of the business location (i.e., "onsite" at the business location). In specific embodiments of invention, the electronic communication 128, itself, may identify the possessor of the mobile communication device as an established customer 120. For example, the electronic communication 128 may comprise an electronic token, such as an electronic credit/debit card, that is issued or otherwise assigned by the business. The electronic token is stored at Operating System (OS)-level within the mobile communication device and, as such, does not require the user to launch or have an application running in order to communicate the token. The electronic communication 128, in the form of a token or the like, may be broadcasted continuously or periodically from the mobile communication device, such as via wireless, cellular or short range wireless communication or the like, or in other embodiments of the invention the electronic communication 128 may be communicated to the application 118 in response to receiving a request from the application or from the business (i.e., another application). In such embodiments of the invention, the mobile communication device may be configured to receive the request based on the mobile communication device storing an business-related application, for example a mobile banking application associated with a financial institution/bank, a customer loyalty application associated with a store or the like. It should be noted that the application is not required to be launched/running for the mobile communication device to receive the request, the mere presence of the application on the mobile communication device will allow for the device to receive the request. In other related embodiments of the invention, the electronic communication 128, itself, does not identify the possessor of the mobile communication device as an established customer but rather includes information about the individual that possesses the mobile communication device. In which case, a customer database may be accessed and the information included in the electronic communication is compared to customer information to determine if the individual that possesses the mobile communication device is an established customer 120 of the business.

In such embodiments of the invention in which receipt of an electronic communication in possession of an individual 114 is used to identify the individual as an established customer 120. The customer recognition and identification application 118 may further be configured to implement location determining mechanism 130 to determine the location of the mobile communication device within the business location 122. The location determining mechanism may include triangulation, Global Positioning System (GPS) or the like. The location of the mobile communication device may be necessary in order to present the customer identifier 122 in the OHMD 116 proximate to the location of the mobile communication device (i.e., proximate to the location of the established customer 120 that is in possession of the mobile communication device).

In response to the identification/determination of an established customer, the customer recognition and identification application 112 is further configured to present customer identifiers 122 in the view 110 of OHMD 116, which serve to identify those individuals that have been identified as established customers 120. In specific embodiments of the invention, the customer identifiers 122 are presented in the display 116 so to "attach" to a corresponding established customer 120. Attachment provides for the customer identifier 122 to follow the corresponding established customer 120 as the established customer moves within (and into and out of) the view 110 displayed within OHMD 116. In this regard, the attached customer identifier 122 provides for augmented reality environment within the view, whereby individuals identified as established customers are continuously identified within the OHMD as such, thus allowing the employee/associate using the wearable computing device 102 to be constantly aware of which individuals are established customers 120 and conversely, which of the individuals are not established customers. In alternative embodiments of the invention, in which the established customer 120 is determined based on receipt of electronic communication 128 from a mobile communication device in possession of the established customer 120, the customer identifier 122 may attach to the mobile communication device 130.

As discussed briefly in relation to FIG. 1, the customer identifier 122 may additionally include embedded access links 132, which allow the employee/associate user to activate the links to access and display the customer profile information 132. The customer profile information may include, but is not limited to, an image of the customer (displayed for confirmation purposes), customer status information (e.g., VIP/high volume account holder status or the like), customer affinity information, previous transactions with the business, accounts held by the customer at the business and the like.

Figure 4:
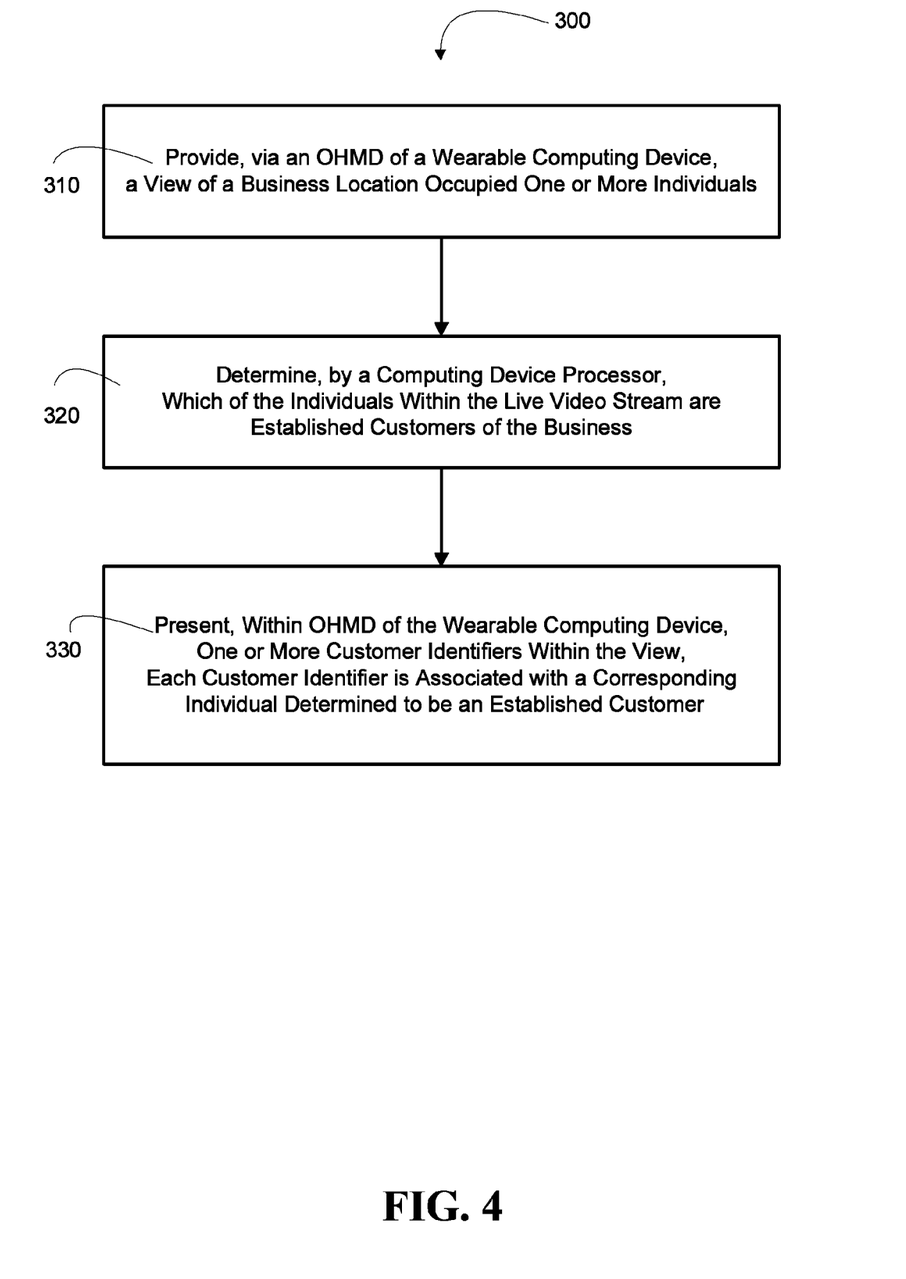
FIG. 4 provides a flow diagram of a method for automatically recognizing the presence of established customers within a business location and identifying the established customers within the view presented to a business associate/employee through the OHMD, in accordance with embodiments of the present invention.

Referring to FIG. 4, a flow diagram is presented of a method 300 for wearable computing device identification of established customers within a business location and identifying the established customers on an associated Optical head-Mounted Display (OHMD), in accordance with embodiments of the present invention. At Event 310, a view is provided, via an OHMD, of a business location, e.g., retail store, banking center or the like, that is occupied by one or more individuals. The individuals are non-employees and may be new or potential customers or pre-existing/established customers of the business.

At Event 320, a determination is made as to which of the individuals in the view are established customers of the business. In specific embodiments of the invention, the determination of established customers includes capturing, from an image capture device within the wearable computing device, facial images of the individuals and accessing a customer database that stores facial images of customers to compare characteristics of the facial images of the individuals in the live video stream to characteristics of the stored facial images of customers. Based on determining matches between the facial images of the individuals in the view to the stored facial images of customers, individuals within the view are identified as being established customers of the business.

In other embodiments of the invention, established customers are determined based on receipt of an electronic communication from a mobile communication device in possession of a corresponding individual displayed in the view. The electronic communication is communicated from the mobile communication device automatically without any overt action being taken by the individual in possession of the device and is communicated based on the mobile communication device being located within predetermined boundaries of the business location (i.e., "onsite" at the business location). In specific embodiments of invention, the electronic communication, itself, may identify the possessor of the mobile communication device as an established customer. For example, the electronic communication may comprise an electronic token, such as an electronic credit/debit card, that is issued or otherwise assigned by the business. The electronic token is stored at the Operating System (OS)-level within the mobile communication device and, as such, does not require the user to launch or have an application running in order to communicate the token. The electronic communication, in the form of a token or the like, may be broadcasted continuously or periodically from the mobile communication device, such as via wireless, cellular or short range wireless communication or the like, or in other embodiments of the invention the electronic communication may be communicated to the application in response to receiving a request from the application or from the business (i.e., another application). In such embodiments of the invention, the mobile communication device may be configured to receive the request based on the mobile communication device storing an business-related application, for example a mobile banking application associated with a financial institution/bank, a customer loyalty application associated with a store or the like. It should be noted that application is not required to be launched/running for the mobile communication device to receive the request, the mere presence of the application on the mobile communication device will allow for the device to receive the request. In other related embodiments of the invention, the electronic communication, itself, does not identify the possessor of the mobile communication device as an established customer but rather includes information about the individual that possesses the mobile communication device. In which case, a customer database may be accessed and the information included in the electronic communication is compared to customer information to determine if the individual that possesses the mobile communication device is an established customer of the business.

At Event 330, one or more customer identifiers are presented within the view displayed within the OHMD of the wearable computing device. Each of the customer identifiers corresponds to an individual in the view that has been determined to be an established customer. The customer identifier may be any graphical display that visually conveys to the user/employee/associate that the individual is an established customer, the identifier may serve to outline, make brighter, superimpose or the like the individual that has been determined to be an established customer. In specific embodiments of the invention, the customer identifiers "attach" to the corresponding individual/established customer, such that as the individual/established customer moves about within the view displayed by the OHMD, the customer identifier follows the individual/established customer, thereby creating an augmented reality environment within the OHMD. Further, the customer identifier may be configured to include a user selectable link or the like, which when activated by the user/employee/associate provides the user access to customer profile information stored by the business. Customer profile information may include, but is not limited to, a photograph of the customer, risk-related information, customer status, customer affinities, transaction conducted by the customer at the business, accounts held by the customer at the business and the like.

Thus, systems, apparatus, methods, and computer program products described above provide for implementing a wearable computing device having an Optical Head-Mounted Display (OHMD) to automatically determine which individuals within a business environment, are established customers. As discussed, such a determination of established customer status is conducted without requiring any action on behalf of the individuals/customers currently located within the business environment and can be accomplished when the established customer enters the business location or shortly thereafter. Once established customers are identified, customer indicators are provided within the view of the OHMD, so that a business associate/employee can readily identity which individual within their field of view are established customers. In addition to identifying those individuals with the business environment that are established customers are providing such information to requisite business associates/employees, the present invention also provides for immediate access or visibility, via the OHMD, to other information related to the established customers relationship with the business, such as customer status, customer affinities, previous customer dealings/transactions, accounts held by the customer and the like.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. An apparatus for recognizing and identifying established customers within a business location, the apparatus comprising:
   a wearable computing device including a memory, a processor in communication with the memory and an Optical Head-Mounted Display (OHMD) in communication with the processor; and
   a customer recognition and identification module stored in the memory, executable by the processor and configured to:
      provide a user, via the OHMD, a view of a business location occupied by one or more individuals,
      determine which of the individuals within the view are established customers of the business by:
         communicating, via short-range wireless communication, a request for customer identification, wherein the request is configured to be received by mobile communication devices that (i) are in possession of corresponding individuals within the view, and (ii) store an application associated with the business, wherein the application is not required to be executing to receive the request,
         in response to communicating the request, receiving, from the mobile communication devices, an Operating System (OS)-level stored electronic token, wherein the electronic token includes a digital signature that identifies an individual in possession of one of the mobile communication devices as an established customer, wherein the electronic token is electronically communicated from the mobile communication device absent user input, and
         determining that the individual in possession of the mobile communication device is an established customer based on matching the digital signature in the electronic token with a known digital signature stored in a database associated with the business, and
      present, within the OHMD, one or more customer identifiers within the view, wherein each of the identifiers are associated with one of the individuals determined to be an established customer of the business.

2. The apparatus of claim 1, wherein the customer recognition and identification module is further configured to determine which of the individuals within the views are established customers by:

capturing, by the wearable computing device, a facial image of the individuals;

determining one or more matches between the facial images of the individuals and facial images of established customers by comparing characteristics of the facial images of the individuals to a database of facial images of established customers; and identifying one or more individuals within the view as established customers based on the one or more determined matches.

3. The apparatus of claim 1, wherein the customer recognition and identification module is further configured to determine the location of the mobile communication devices determined to be in possession of the established customers and wherein the customer identifiers are presented, within the OHMD, proximate to the location of the mobile communication devices.

4. The apparatus of claim 1, wherein the customer recognition and identification module is further configured to present, within the OHMD, one or more customer identifiers within the view, wherein each customer identifier attaches to a corresponding established customer displayed within the OHMD and follows the corresponding established customer as they move within the view of the user.

5. The apparatus of claim 1, wherein the customer recognition and identification module is further configured to provide the user selectable access to display, on the OHMD, of customer profile information associated with each of the established customer.

6. The apparatus of claim 3, wherein the customer recognition and identification module is further configured to provide the user selectable access to display, on the OHMD, of the customer profile information including at least one of customer status, customer affinity, accounts held by the established customer at the business or products purchased at the business by the established customer.

7. A method for automated customer recognition and identification within a business location, the method comprising:

providing a user, via an Optical-Head Mounted Display (OHMD) of a wearable computing device, a view of a business location occupied by one or more individuals;

determining, by a computing device processor, which of the individuals within the view are established customers of the business by:

communicating, via short-range wireless communication, a request for customer identification, wherein the request is configured to be received by mobile communication devices that (i) are in possession of corresponding individuals within the view and (ii) store an application associated with the business, wherein the application is not required to be executing to receive the request, in response to communicating the request, receiving an Operating-System (OS)-level stored electronic token from the mobile communication devices, wherein the electronic token includes a digital signature that identifies an individual in possession of one of the mobile communication devices as an established customer and is electronically communicated from the mobile communication device absent user input, and determining that the individual in possession of the mobile communication device is an established customer based on matching the digital signature in the electronic token with a known digital signature stored in a database associated with the business; and presenting, within the OHMD, one or more customer identifiers within the view, wherein each of the identifiers are associated with one of the individuals determined to be an established customer of the business.

8. The method of claim 7, wherein determining which of the individuals within the views are established customers further comprises:

capturing, by the wearable computing device, a facial image of the individuals;

determining, by a computing device, one or more matches between the facial images of the individuals and facial images of established customers by comparing characteristics of the facial images of the individuals to a database of facial images of established customers; and identifying, by a computing device, one or more individuals within the view as established customers based on the one or more determined matches.

9. The method of claim 7, further comprising determining, by a computing device processor, the location of the mobile communication devices determined to be in possession of the established customers and wherein presenting, within the OHMD, the one or more customer identifiers further comprises presenting, within the OHMD, the one or more customer identifiers proximate to the location of the mobile communication devices.

10. The method of claim 7, wherein presenting, within the OHMD, the one or more customer identifiers within the view further comprises presenting, within the OHMD, the one or more customer identifiers within the view, wherein each customer identifier attaches to a corresponding established customer displayed within the OHMD and follows the corresponding established customer as they move within the view of the user.

11. The method of claim 7, further comprising providing, by a computing device processor, selectable access to display, on the OHMD, of customer profile information associated with each of the established customer, wherein the customer profile information includes at least one of customer status, customer affinity, accounts held by the established customer at the business or products purchased at the business by the established customer.

12. A computer program product comprising:

a non-transitory computer-readable medium comprising:

a first set of codes for causing a computer to determine which of one or more individuals displayed within a view of an Optical-Head Mounted Display (OHMD) are established customers of a business by:

communicating, via short-range wireless communication, a request for customer identification, wherein the request is configured to be received by mobile communication devices that (i) are in possession of corresponding individuals within the view and (ii) store an application associated with the business, wherein the application is not required to be executing to receive the request, in response to communicating the request, receiving an Operating-System (OS)-level stored electronic token from the mobile communication devices, wherein the electronic token includes a digital signature that identifies an individual in possession of one of the mobile communication devices as an established customer and is electronically communicated from the mobile communication device absent user input, and determining that the individual in possession of the mobile communication device is an established customer based on matching the digital signature in the electronic token with a known digital signature stored in a database associated with the business; and a second set of codes for causing a computer to present, within the OHMD, one or more customer identifiers within the view, wherein each of the identifiers are associated with one of the individuals determined to be an established customer of the business.

13. The computer program product of claim 12, wherein the first set of codes is further configured to cause the computer to (1) capture a facial image of the individuals, (2) determine one or more matches between the facial images of the individuals and facial images of established customers by comparing characteristics of the facial images of the individuals to a database of facial images of established customers, and (3) identify one or more individuals within the view as established customers based on the one or more determined matches.

14. The computer program product of claim 12, further comprising a third set of codes for causing a computer to determine the location of the mobile communication devices determined to be in possession of the established customers and the second set of codes is further configured to cause the computer to present, within the OHMD, the one or more customer identifiers proximate to the location of the mobile communication devices.

15. The computer program product of claim 12, wherein the second set of codes is further configured to cause the computer to present, within the OHMD, the one or more customer identifiers within the view, wherein each customer identifier attaches to a corresponding established customer displayed within the OHMD and follows the corresponding established customer as they move within the view of the user.

16. The computer program product of claim 12, wherein the second set of codes is further configured to cause the computer to provide selectable access to display, on the OHMD, of customer profile information associated with each of the established customer, wherein the customer profile information includes at least one of customer status, customer affinity, accounts held by the established customer at the business or products purchased at the business by the established customer.

\* \* \* \* \*